(12) United States Patent
Shaw et al.

(10) Patent No.: US 7,685,529 B2
(45) Date of Patent: Mar. 23, 2010

(54) VISUAL GUIDES FOR WORD PROCESSING APPLICATION STYLES

(75) Inventors: Han-Yi Shaw, Redmond, WA (US); Brian M. Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 11/377,970

(22) Filed: Mar. 17, 2006

(65) Prior Publication Data
US 2007/0220424 A1    Sep. 20, 2007

(51) Int. Cl.
*G06F 3/048* (2006.01)
*G06F 17/21* (2006.01)

(52) U.S. Cl. .................. 715/764; 715/269; 715/787; 715/841

(58) Field of Classification Search ............ 715/269, 715/787, 841, 764
See application file for complete search history.

(56) References Cited

U.S. PATENT DOCUMENTS

| | | | | |
|---|---|---|---|---|
| 5,532,715 | A * | 7/1996 | Bates et al. | 345/684 |
| 5,623,588 | A * | 4/1997 | Gould | 715/787 |
| 5,694,610 | A * | 12/1997 | Habib et al. | 715/210 |
| 6,088,711 | A * | 7/2000 | Fein et al. | 715/269 |
| 6,177,933 | B1 * | 1/2001 | Young | 715/805 |
| 6,567,830 | B1 * | 5/2003 | Madduri | 715/235 |
| 6,700,591 | B1 * | 3/2004 | Sharpe | 715/762 |
| 7,111,238 | B1 * | 9/2006 | Kuppusamy et al. | 715/269 |
| 7,421,664 | B2 * | 9/2008 | Wattenberg et al. | 715/823 |
| 7,444,591 | B1 * | 10/2008 | Sorenson | 715/269 |
| 2002/0010717 | A1 * | 1/2002 | Breuer et al. | 707/517 |
| 2002/0186252 | A1 * | 12/2002 | Himmel et al. | 345/787 |
| 2002/0188637 | A1 * | 12/2002 | Bailey et al. | 707/530 |

OTHER PUBLICATIONS

Millhollon et al., Microsoft Office Word 2003 Inside Out, Microsoft Press, Published: Nov. 5, 2003, pp. 264-286.*
Morris, Creating Pages With iWork: Visual QuickProject Guide, Peachpit Press, Published: Sep. 26, 2005.*

* cited by examiner

*Primary Examiner*—Adam L Basehoar
*Assistant Examiner*—Yasin Patterson
(74) *Attorney, Agent, or Firm*—Vierra Magen Marcus & DeNiro LLP (57) ABSTRACT

A graphical user interface is disclosed for providing a visual and/or numeric aid facilitating the use formatting styles in word processing application programs and others. Visual and numeric indicators are assigned to all styles defined within the word processing application program. The visual indicator may be a unique color assigned and applied to each defined style. Upon launching the visual aids functionality, each style name in a styles pallet is displayed with its assigned visual and numeric indicators. The visual and numeric indicators are also displayed along side the text, with text of a given style being displayed with the visual and numeric indicator assigned to the style name. Thus, the visual aids allow a user to quickly ascertain which styles are applied to what text.

17 Claims, 7 Drawing Sheets

VISUAL GUIDES FOR WORD PROCESSING APPLICATION STYLES

BACKGROUND

Computer operating systems frequently employ a graphical user interface ("GUI") to convey information to users over a display by various combinations of graphical items, such as icons, text, drop-down menus, dialog boxes, and toolbars. A GUI provides an interface to the operating system, and to application programs running in conjunction with the operating system. The goal of most user interfaces is to provide a rich user experience where the user can quickly and easily access a wide variety of operating system and/or application program functions.

A powerful yet underutilized feature of the GUI in many word processing application programs is the style function, commonly referred to simply as "styles." Styles are formatting instructions, grouped together under an assigned name, that apply a number of formatting attributes simultaneously to text to manage the overall appearance of a document. Styles may be applied to format words, sentences, text blocks, paragraphs, numbers lists and tables. Many word processing application programs, such as Microsoft® Word, apply a default style, i.e., "normal," to new documents. The default normal style may for example format a document to include Times New Roman, 12pt, as the font, left justification, single line spacing, etc., although a user may vary the formatting attributes of the default normal style. Thus, styles are typically applied to a document even without the knowledge of the user. Microsoft® Word also includes a number of additional predefined styles that a user may apply, as well as the ability for users to create new, user-defined styles.

In Microsoft® Word, styles may for example be applied to a document from a styles pallet, such as for example the "Styles and Formatting" pane in the Windows version and from the "Styles" pane in the Formatting Palette in the Macintosh version. The styles pallet includes a listing of the predefined and user-defined styles, as well as an option to create new styles. A user may apply a style to a paragraph by positioning the cursor at or within that paragraph, and then selecting the desired style. Similarly, a user may apply a style to selected text by selecting (highlighting) a text block and then selecting the desired style from the pane. The pane may also include a window for displaying the style name applied to the text where the cursor is positioned.

The use of styles to format documents may be distinguished from direct formatting, where text is formatted using individual features from the GUI toolbars and menus (e.g., bold, justification, font, color, etc). The use of styles presents advantages over direct formatting, in that styles can affect a variety of attribute formatting with a single keystroke or mouse click. Moreover, with styles, it is easier to make formatting changes. With styles, by changing the style in the Word UI, the appearance of text is changed throughout the document wherever that style is applied. With direct formatting, the changes must be manually made throughout the document.

Despite the advantages of styles, the feature is often underutilized. It would be beneficial to provide an easy entry toward understanding the application and operation of styles. Moreover, when using styles, it may be difficult to discern which styles are applied to which sections of a document, especially in larger documents. Aside from positioning the cursor at a given location to see which style is highlighted or displayed in the styles pallet, there is no visual aid to determining which styles are applied to which sections of a document.

SUMMARY

The present system, roughly described, relates to a graphical user interface for providing a visual and/or numeric aid facilitating the use of formatting styles in word processing application programs and others. It is known to provide a graphical object in the form of a styles pallet over a GUI. The styles pallet displays the stored styles for formatting text within a document. According the present system, the styles pallet may further include a visual aids feature which may be launched by a single mouse click or key stroke.

The present system assigns a visual and numeric indicator to styles defined within the word processing application program. The visual indicator may, for example, be a unique color assigned and applied to each defined style. The assigned visual and numeric indicators may be stored in memory as part of or associated with a particular style. Upon launching the visual aids functionality, each style in the styles pallet is displayed with its assigned visual and numeric indicators. The visual and numeric indicators are also displayed along side the text, with text of a given style being displayed with the same visual and numeric indicator assigned to that style. Thus, the visual aids allow a user to quickly ascertain which styles are applied to what text.

The visual and numeric indicators for the document text may be provided to the side of the text, for example, within the left margin of the displayed document. Where a visual indicator alongside of document text takes up a plurality of consecutive lines, the visual indicator may be a plurality of graphical objects displayed in the screen, each having a height equal to the height of a line of text. Alternatively, the visual indicator may be one single graphical object spanning all of the lines of text having that particular style. The numeric indicator may appear in the first line of text of a given style.

The present system may further highlight text that is formatted using direct formatting. The directly formatted text may be highlighted by placing a graphical box around the text to indicate that this text is formatted using direct formatting instead of through application of a style.

In embodiments, the present system may further display the name of a style and/or the formatting attributes of the style upon a hover over (i.e., positioning the cursor over) the visual and/or numeric indicator displayed along side text.

DETAILED DESCRIPTION

The present system will now be described with reference to FIGS. 1 through 6, which in embodiments relate to a GUI allowing users to interface with a computer operating system and/or application programs running in conjunction with the operating system. The present system may operate over a wide variety of operating systems using user interfaces, including for example the Macintosh operating system by Apple Computer, Inc., the Windows® operating system from Microsoft Corporation, and the Linux operating system.

Figure 1:
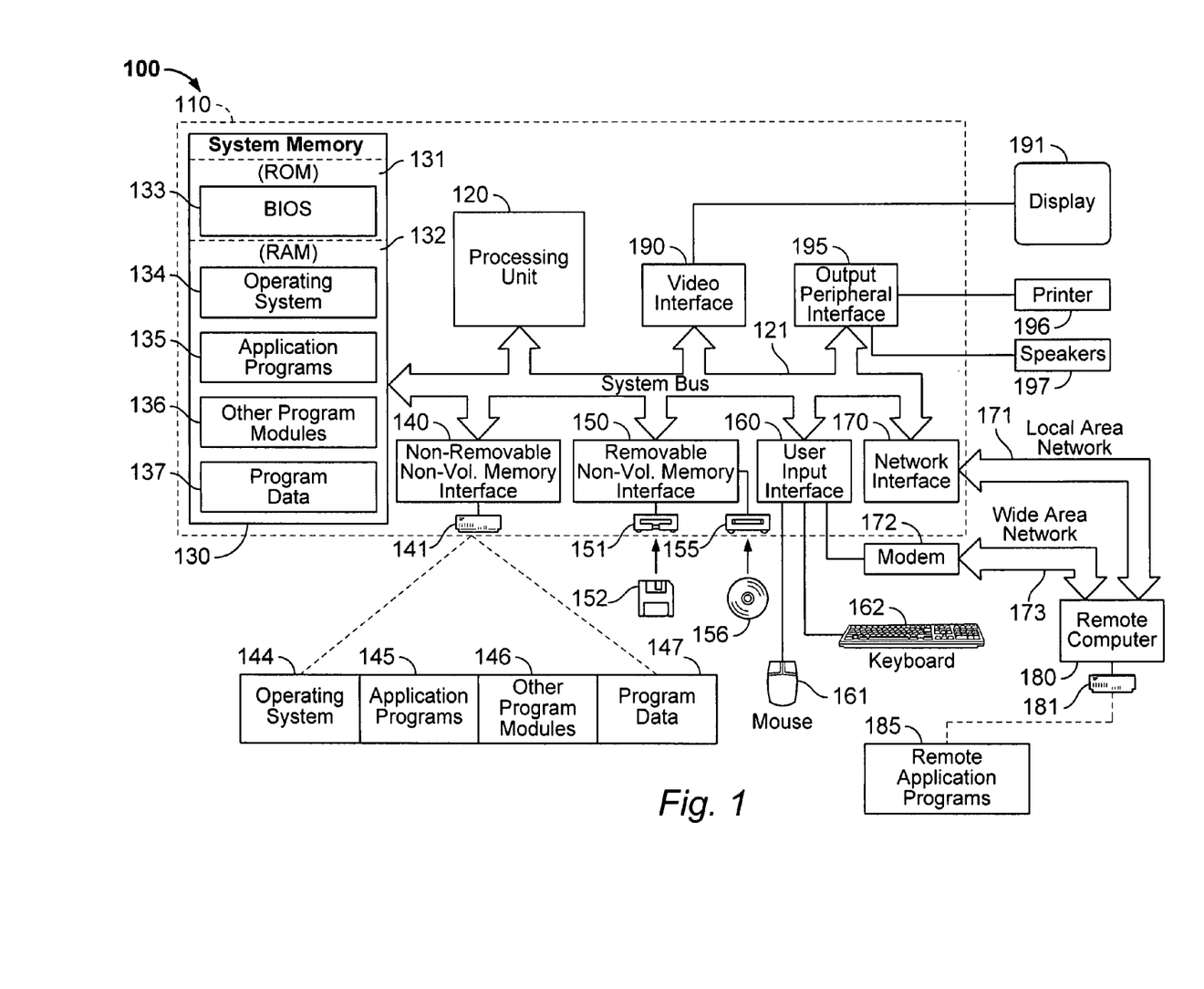
FIG. 1 is a block diagram of a computer hardware for implementing embodiments of the present system.

The GUI described herein can be implemented on a variety of processing systems. FIG. 1 illustrates an example of a suitable general computing system environment 100 on which the present system may be implemented. The computing system environment 100 is only one example of a suitable computing environment and is not intended to suggest any limitation as to the scope of use or functionality of the system. Neither should the computing system environment 100 be interpreted as having any dependency or requirement relating to any one or combination of components illustrated in the exemplary computing system environment 100.

The present system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices including personal digital assistants and mobile telephones, distributed computing environments that include any of the above systems or devices, and the like.

The present system may be described in the general context of computer-executable instructions, such as program modules, being executed by a computer. Generally, program modules include routines, programs, objects, components, data structures, etc., that perform particular tasks or implement particular abstract data types. The present system may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, and removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), electrically erasable programmable read-only memory (EEPROM), flash memory or other memory technology, CD-ROM, digital versatile disks (DVD) or other optical disk storage, magnetic cassettes, magnetic tapes, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The application programs 135 stored in system memory 130 may include the GUI for performing the present system as described hereinafter. When one of the application programs including the GUI of the present system is launched, it runs on the operating system 134 while executing on the processing unit 120. An example of an operating system on which the application programs including the present GUI may run is the Macintosh operating system by Apple Computer, Inc., but the application programs including the present GUI may operate on a variety of operating systems including also the Windows® operating system from Microsoft Corporation, or the Linux operating system. The application programs including the present GUI may be loaded into the memory 130 from the CD-ROM drive 155, or alternatively, downloaded from over network 171 or network 173.

Figure 2A:
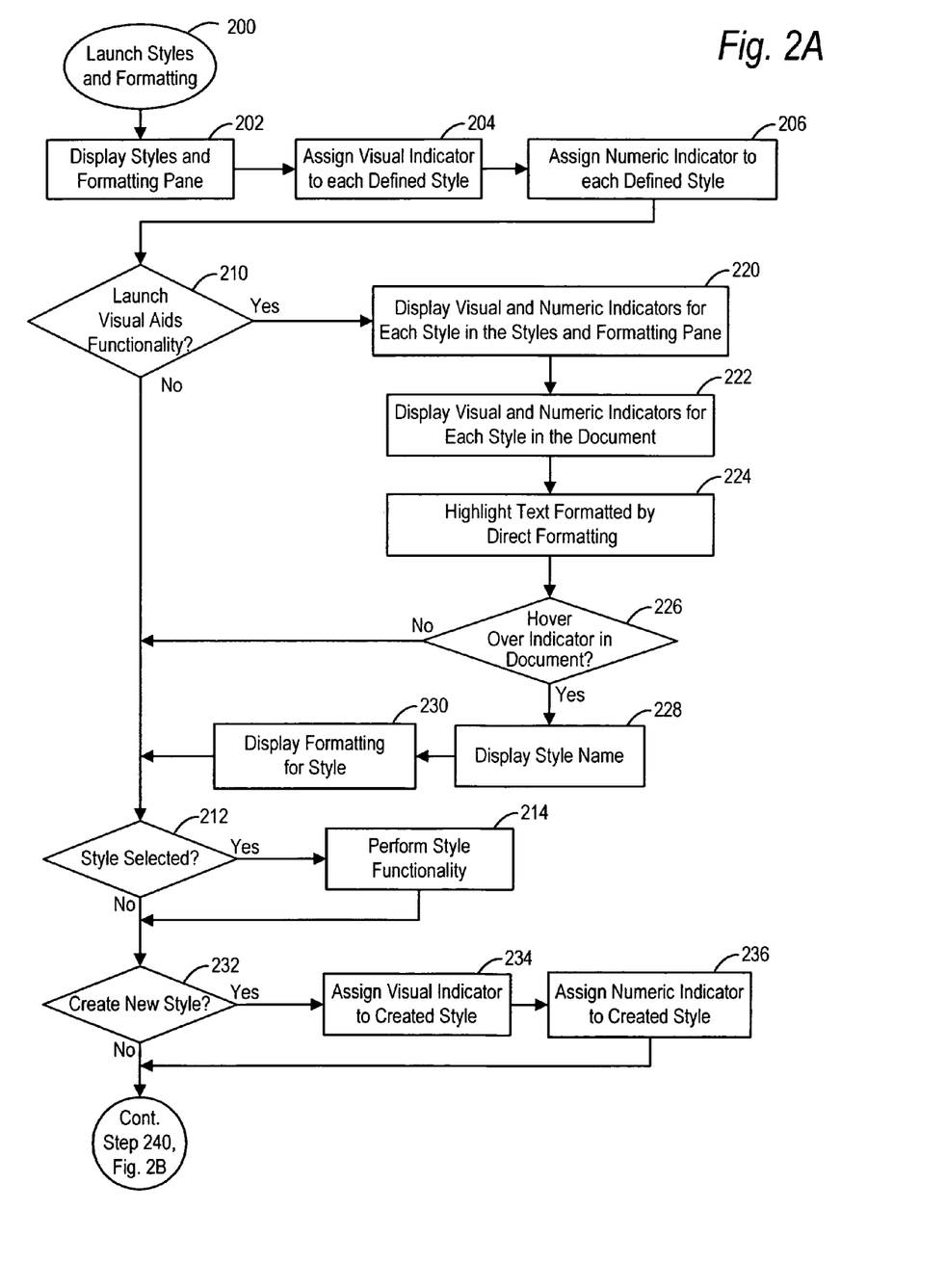
FIGS. 2A and 2B are a flowchart for the operation of the visual aids functionality associated with styles according to the present system.
Figure 2B:
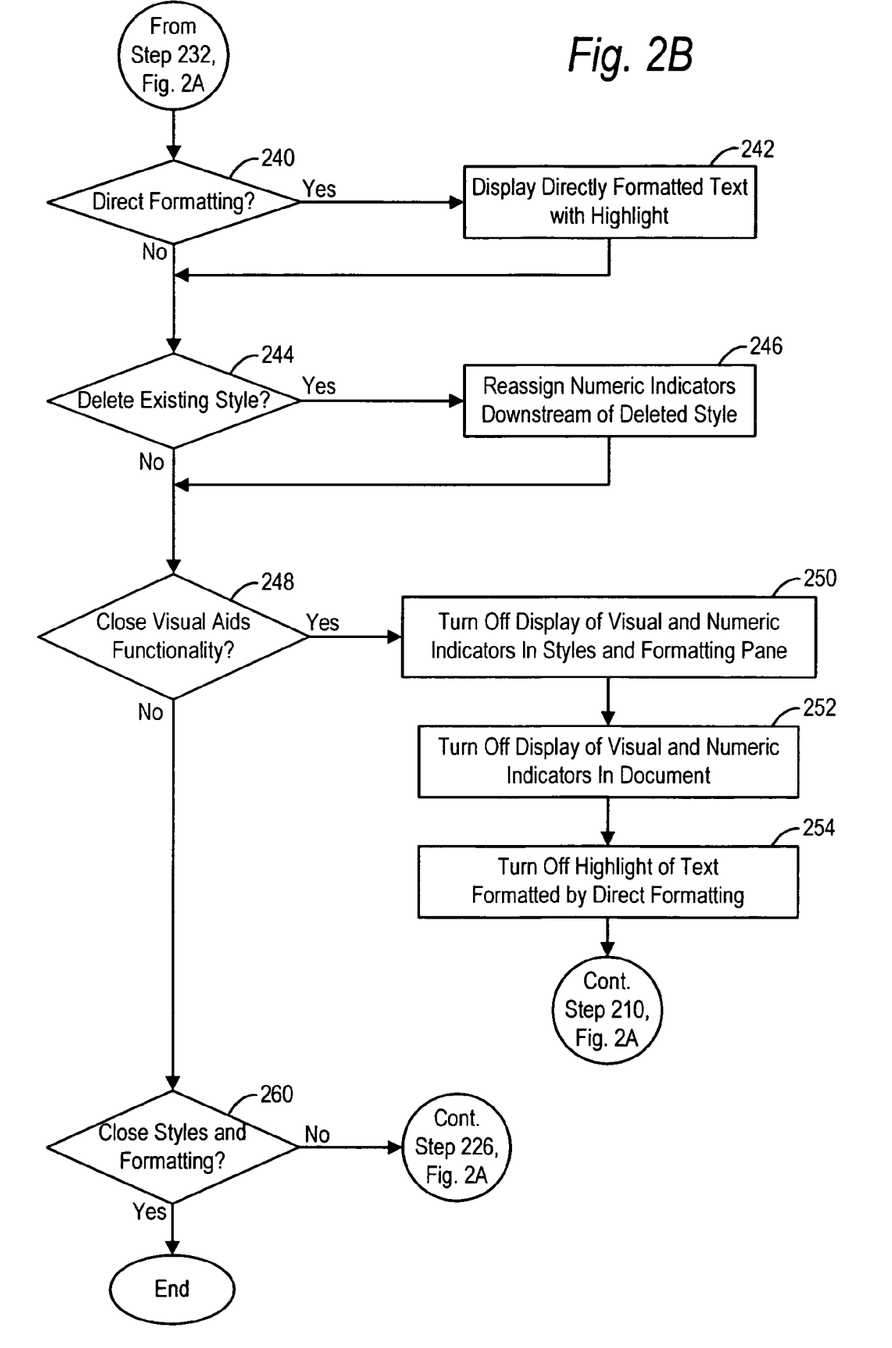

The present system will now be described with reference to the flowcharts of FIGS. 2A and 2B, and sample screen depictions of FIGS. 3 through 6. The software of the present system will be described hereinafter with respect to a word processing application program, such as for example Microsoft® Word. However, it is understood that the software of the present system may provide a user interface which may be contextually adjusted for a variety of application programs, e.g., word processing, presentation, spreadsheet, drawing, and/or other application program types.

FIGS. 3 through 6 illustrate a GUI 400 shown over a display 191. The GUI 400 includes a graphical object 402, which is a styles pallet for formatting text as explained hereinafter. The styles pallet may for example be a "Styles and Formatting" pane in the Windows version of Microsoft Word, or from the "Styles" pane in the Formatting Palette in the Macintosh version of Microsoft Word. The styles pallet displays the names of styles stored for the word processing application program. The generation and display of the styles pallet 402, and the names of the styles displayed in the styles pallet, are known in the art. Pallet 402 may further include a visual aids check box 406 for launching the visual aids feature of the present system as described in greater detail hereinafter.

Figure 3:
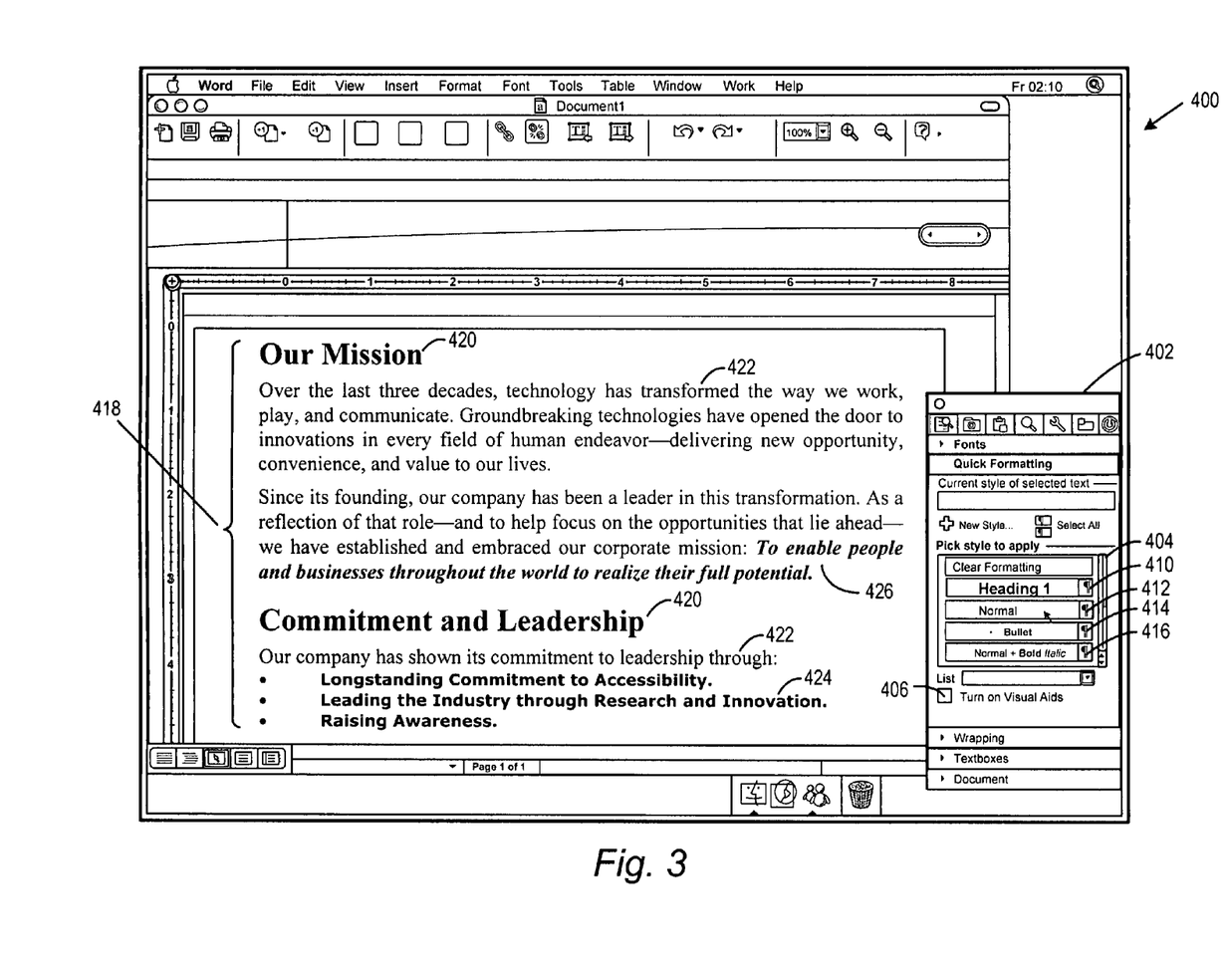
FIGS. 3-6 are sample screen depictions from a displayed graphical user interface according to the present system.

Pallet 402 of FIG. 3 includes the names 410 through 416 of styles, which are named "Heading 1," "Normal," "• Bullet," and "Normal+Bold Italic," respectively. Depending on the size of pallet 402, pallet 402 may include more style names than there is room to be displayed within the pane. A scroll bar 404 may be provided to scroll through the variety of style names included in the styles pallet 402. The style names shown in pallet 402 are by way of example only, and a variety of additional or alternative style names may be included within pallet 402 as is known in the art. Moreover, as is known, the word processing application program may store more predefined and/or user-defined styles than are included within pallet 402 at any given time (i.e., some style names are not displayed even upon scrolling through all of the style names in pallet 402). The pallet 402 may include an option to show all style names, in which event all predefined and user-defined styles stored in the word processing application program may be included in pallet 402 and visible upon scrolling through the style names.

Also shown on GUI 400 is a sample block of text 418. The text block 418 is formatted with a variety of different styles. For example, text 418 includes section headings 420 of a first style, normal text 422 of a second style, bulleted text 424 of a third style and bolded and italicized text 426 of a fourth style. The text block 418 has been formatted using the styles pallet 402 as explained in greater detail hereinafter. It is understood that text 418, and the styles applied thereto, are merely by way of example, and the present system as described hereinafter may be used on any text and any styles.

When using a word processing application program, the styles functionality may be launched at step 200 (FIG. 2A) by clicking a link from a toolbar, drop-down menu and/or pallet appearing on the GUI window of the application program. Once launched, the application program displays the styles pallet 402 (step 202). Formatting pallet 402 may be positioned and resized as desired on GUI 400.

In step 204, the present system assigns a visual indicator to all styles defined within the word processing application program. The visual indicator may, for example, be a unique color assigned to each defined style and applied as described hereinafter. The visual indicator may be other than a color in alternative embodiments, such as for example, a unique highlighting, shading or colored border applied to each style.

As indicated above, the styles pallet 402 may only include a portion of the style names defined within the word processing application program. In embodiments, a style may be assigned a visual indicator whether or not it is included in the pallet 402, while in alternative embodiments, only those style names included within pallet 402 may be assigned a visual indicator. In such an embodiment, as styles are added to pallet 402, they are assigned visual indicators.

In addition to a visual indicator, each style defined within the word processing application program may also be assigned a numeric indicator, i.e., a number (step 206). In alternative embodiments, instead of numbers, each defined style may be assigned a unique alpha numeric character or other unique symbol. In embodiments, a style may be assigned a numeric indicator whether or not it is included in the pallet 402, while in alternative embodiments, only those style names included within pallet 402 may be assigned a numeric indicator. In such an embodiment, as styles are added to pallet 402, they are assigned numeric indicators.

The assigned visual and numeric indicators may be stored as part of or associated with a particular style (for example along with the formatting attributes for that style), so that when a style is selected and its associated formatting attributes are applied to selected text, the visual and numeric indicators are also displayed alongside that text as explained in greater detail hereinafter.

As indicated above, pallet 402 includes a visual aids check box 406. Upon selecting visual aids check box 406, for example by positioning a graphical screen cursor thereover and clicking a mouse pointing device, a user may launch the visual aids functionality according to the present system. In general, upon launching the visual aids functionality, each style name in the styles pallet 402 is displayed with its assigned visual and numeric indicators. The visual and numeric indicators are also displayed along side the text, with text of a given style being displayed with the same visual and numeric indicator assigned to that style name. Thus, the visual aids on GUI 400 allow a user to quickly ascertain which styles are applied to what text. Moreover, the visual aids functionality may be turned on and off with a single mouse click, within visual aids functionality check box 406 or elsewhere.

Referring again to FIG. 2A, the present system checks in a step 210 whether a user has launched the visual aids functionality as indicated above. The visual aids functionality may be launched by users selecting the visual aids functionality check box 406 on styles pallet 402. It is understood that the visual aids functionality according to the present system may be launched from other toolbars and graphical windows. If a user has not launched the visual aids functionality in step 210, the software may next check whether a style from the styles pallet 402 has been selected in step 212. If so, the selected style is applied to the referenced text in step 214 in a known manner.

Figure 4:
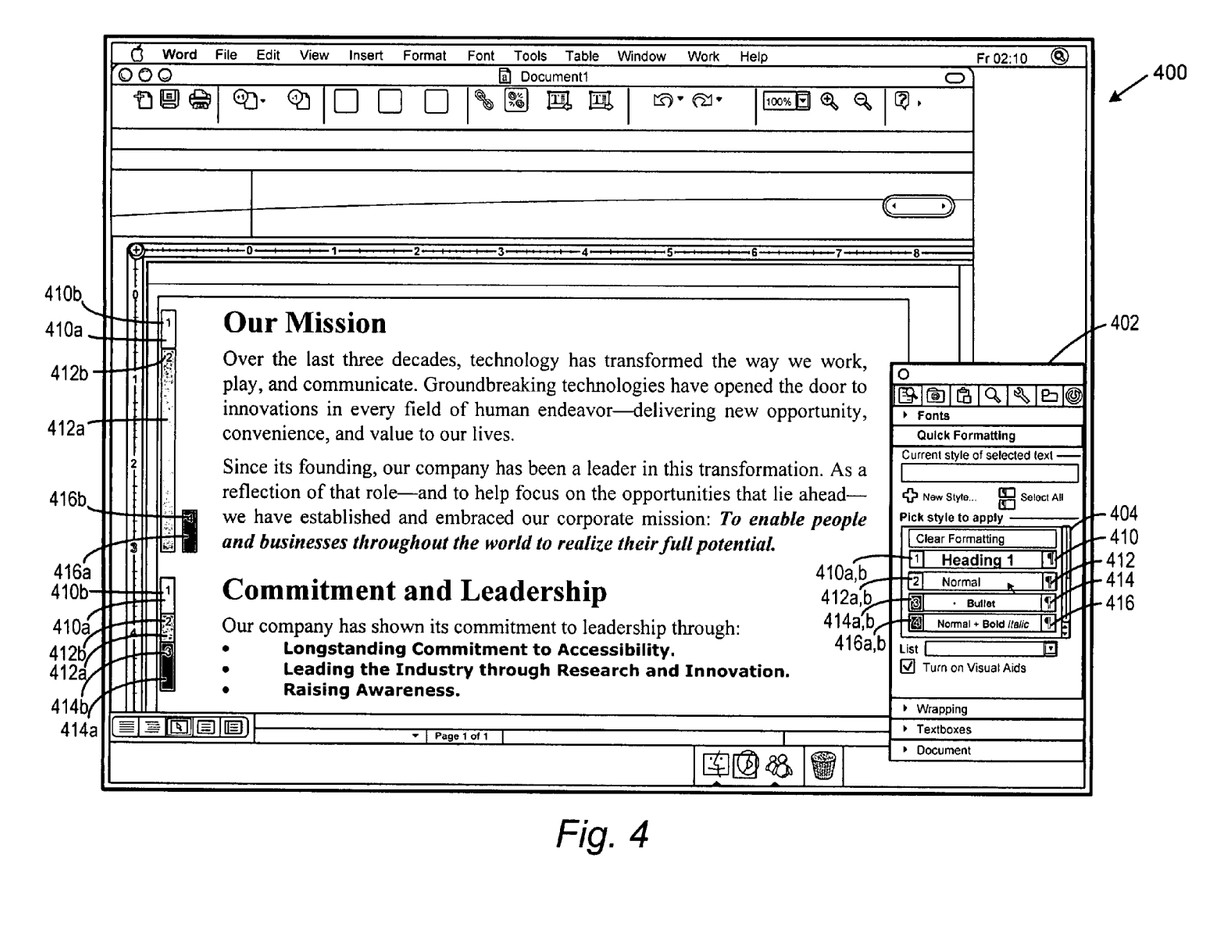
Figure 5:
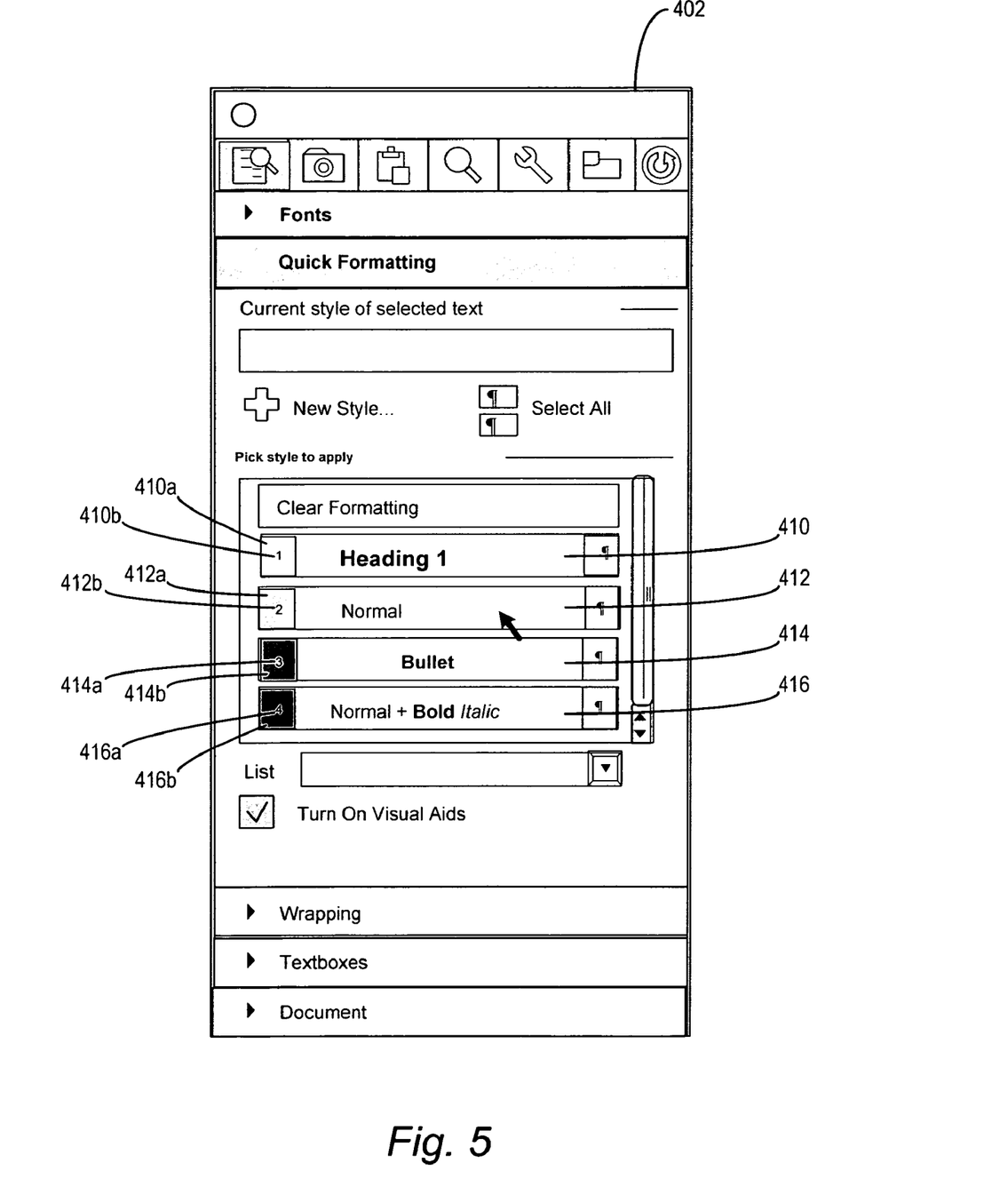

Alternatively, if in step 210 it is determined that the user has launched the visual aids functionality, then the present system displays the visual and numeric indicators for each style name in the styles pallet in step 220. For example, as shown in FIGS. 4 and 5, upon selecting the visual aids functionality check box 406, visual indicators 410*a*, 412*a*, 414*a* and 416*a* may appear next to each of the style names displayed within styles pallet 402. As indicated above, each style name may have a different visual indicator, such as, for example, a different colored box next to each style. Similarly, upon selecting the visual aids functionality check box 406, numeric indicators 410*b*, 412*b*, 414*b* and 416*b* may appear next to each of the style names displayed within styles pallet 402.

In FIGS. 4 and 5, the visual indicators are shown as boxes to the left of each displayed style name. It is understood that the visual indicator boxes may appear elsewhere as long as it may be determined which visual indicators are associated with which style names. In embodiments, the numeric indicator is displayed within the visual indicator as shown in FIGS. 4 and 5, but the numeric indicator need not be displayed on the visual indicator in alternative embodiments. In a further embodiment, instead of being a box to the side of the named style, the style name itself may be displayed on a colored background, which colored background is the visual indicator. In embodiments, the numeric indicators may appear sequentially from the top displayed style name down to the bottom displayed style name. It is understood that numeric indicators need not be sequential in further embodiments of the present system.

Referring again to FIG. 2A, in addition to displaying the visual and numeric indicators within the styles pallet 402, the visual and numeric indicators for a given style may also be displayed next to the text formatted with that style in the document in step 222. The visual and numeric indicators for a given style may be displayed alongside the text having that style. Thus, as the text 420—"Our Mission" and "Commitment To Leadership"—is formatted with style "Heading 1," this text is displayed with visual indicator 410*a* and numeric indicator 410*b* along the side of the text. The normal text 422 has visual indicator 412*a* and numeric indicator 412*b* displayed along side the text 422. The bulleted text 424 has visual indicator 414*a* and numeric indicator 414*b* displayed along side the text 424. And the normal, bolded and italicized text 426 has visual indicator 416*a* and numeric indicator 416*b* displayed along side the text 426.

Some styles may build on other styles. That is, a given style (referred to herein as a build-on style) may include all of the formatting attributes of another style, plus additional formatting attributes. For example, normal plus bold, italic style 416 applied to text 426 includes all of the formatting attributes of normal style 412 applied to text 422, plus the additional formatting attributes of being bold and italicized. According to the present system, where a second style builds on a first style, the visual and numeric indicator for text having the second style may appear alongside the visual and numeric indicator for text having the first style. Thus, as shown in FIG. 4, the visual and numeric indicator 416*a, b* for the normal, bold and italicized text 426 appears alongside the visual and numeric indicator 412*a, b* for normal text 422. In alternative embodiments, for text having a build-on style, instead of displaying visual and numeric indicators for the build-on style alongside of the underlying style, the present system may display only the visual and numeric indicator for the build-on style.

The visual and numeric indicators for the document text may be provided off to the side of the text, for example, within the left margin of the displayed document. It is understood that the visual and numeric indicators for the document text may be located elsewhere in alternative embodiments, for example, in the right margin of the displayed document, or outside of the boundaries of the page displayed on the screen. In further embodiments of the present system, the visual indicator may be a colored background applied directly to the actual text within the document. In such an embodiment, the numeric indicator may be displayed within a box to the side of the text, or not at all.

Where a visual indicator alongside of document text takes up a plurality of consecutive lines, the visual indicator may be a plurality of rectangular or square graphical objects displayed on the screen. Each such graphical object may have a height equal to the height of a line of text, so that the end of one visual indicator graphical object joins contiguously with the beginning of the visual indicator graphical object of the next adjacent line of text. Alternatively, where a graphical indicator spans a plurality of contiguous lines, the graphical indicator may be provided as one single graphical object spanning all of the text lines having that particular style. In the embodiment shown, the numeric indicator appears in the first line of text of a given style. Where a style is applied to a plurality of contiguous lines, the numeric indicator may appear at locations other than at the first line, such as, for example, at the midpoint along the length of the visual indicator, or at the bottom line of the visual indicator. In alternative embodiments, where a style is applied to a plurality of contiguous lines, the numerical indicator for that style may appear on every line of text.

As explained in the Background section, certain text may be formatted using direct formatting as opposed to styles. The present system may therefore perform a step 224 of highlighting text formatted by direct formatting. This feature is shown, for example, in FIG. 6.

Figure 6:
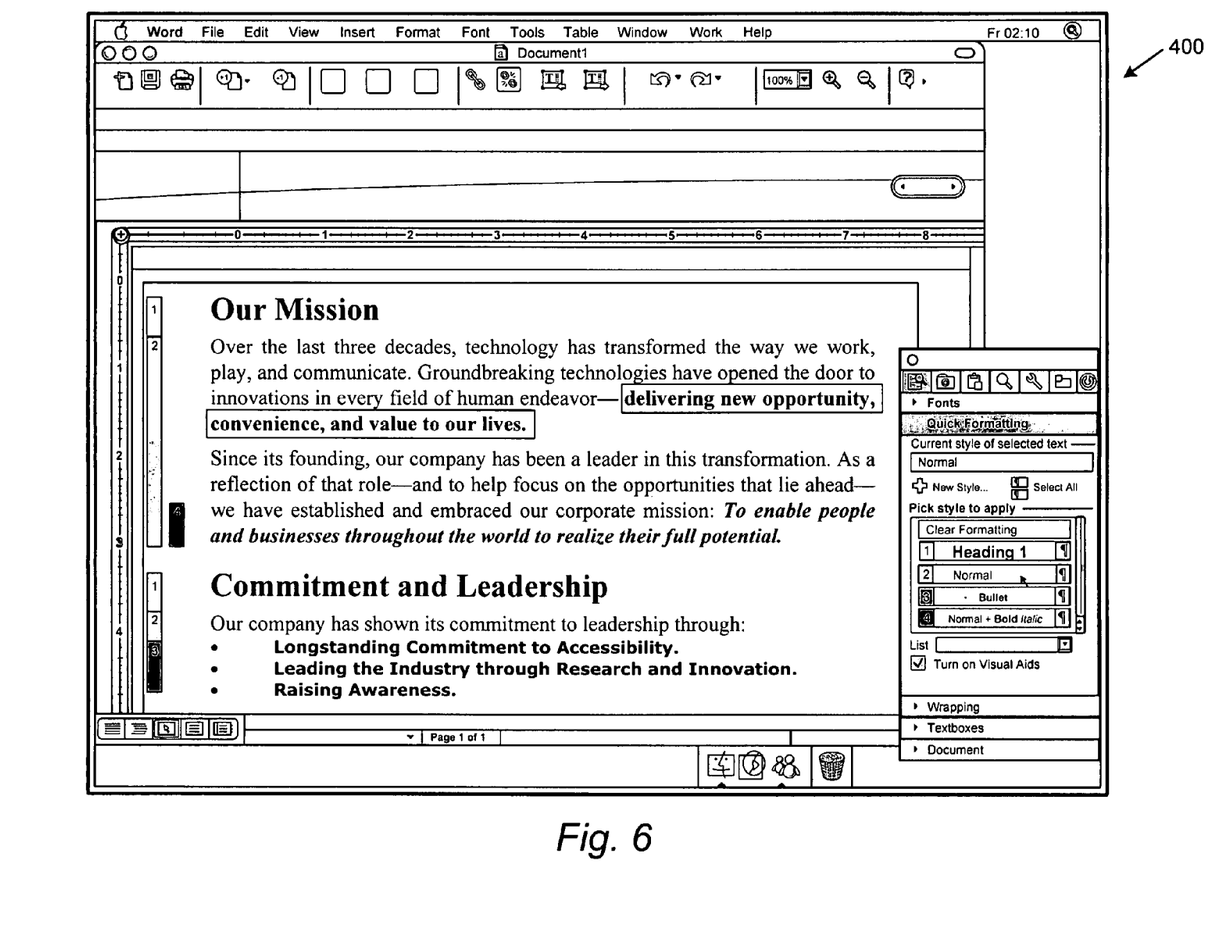

In the embodiment shown in FIG. 6, a user has directly formatted the phrase "delivering new opportunity, convenience, and value to our lives" with bold text. This may be done in a known manner, for example using the bold formatting option available from the toolbar or the Control-B keystrokes available in many word processing application programs. As shown in FIG. 6, this directly formatted text may be highlighted by placing a graphical box around the text to indicate that this text is formatted using direct formatting instead of through application of a style. This information will allow users to quickly know which text is directly formatted and which text is formatted using styles functionality. Such information is useful when for example when altering the formatting within a document.

It is understood that directly formatted text may be highlighted by other visual indicators beside being enclosed within a box in alternative embodiments. It is understood that the step 224 of highlighting directly formatted text may be omitted in alternative embodiments of the present system.

It is known to display the formatting attributes of a given style when the graphical cursor on the screen is positioned over (i.e., hovers over) a particular style name in the styles pallet 402. For example, if the graphical cursor hovers over the normal style within the styles pallet, a pop-up window may appear displaying the formatting attributes of the normal style, such as, for example, Times New Roman, 12 point, left justification, etc.

In accordance with a further aspect of the present system, a step 226 may be performed when the present system detects that the graphical cursor is hovering over a visual indicator and/or numeric indicator alongside the document text. If so, the present system may display in a pop-up window the style name of the style applied to the associated text in step 228, and/or may display in a pop-up window the formatting attributes for that style in step 230. It is understood that each of steps 226 to 230 may be omitted so that no pop-up window is displayed upon a hover over the visual indicators alongside the text.

In the above description, the visual indicator and numeric indicator are assigned to styles upon launching the styles and formatting functionality in step 200. In an alternative embodiment, the visual indicator and numeric indicator may only be assigned upon launching the visual aids functionality according to the present system in step 210. In a further alternative embodiment, the visual and numeric indicators may be assigned upon initially launching the word processing application program including the software of the present system.

Referring again to FIG. 2A, whether or not the visual aids functionality in step 210 is selected, a user may select a style to apply to text in step 212. If a style is selected, the style is applied to the text in step 214 in a known manner.

As indicated above, word processing application programs may allow a use to create new, user-defined styles. In step 232, the present system checks whether a user has created a new style. If so, the present system assigns a new visual indicator to the created style in step 234, and assigns a new numeric indicator to the created style in step 236.

In step 240 (FIG. 2B), the present system may check whether a user is applying new direct formatting to text. If so, the text formatted with newly applied direct formatting may be highlighted in step 242 as described above.

It is possible that a word processing application program may provide the ability to delete an existing style. In such an event, the present system may determine whether or not an existing style has been deleted in step 244. If so, the present system may reassign numeric indicators downstream of a deleted style (i.e., reassign numeric indicators to all styles having a higher numeric indicator than the deleted style) in step 246. In this way, numeric gaps between numeric indicators may be avoided. It is understand that steps 244 and 246 may be omitted in embodiments of the present system.

In step 248, the present system checks whether the visual aids functionality is terminated. The visual aids functionality may be terminated, for example, by deselecting check box 406 in the styles pallet 402. In the event the visual aids functionality is terminated, GUI 400 returns to the state shown in FIG. 3. Namely, a display of the visual and numeric indicators in the styles pallet will be turned off (step 250), the display of the visual and numeric indicators alongside the text in the document may be turned off (step 252), and the highlighting associated with any directly formatted text may be removed (step 254). Thereafter, the present system may return to step 210 to determine whether the visual aids functionality has again been launched, and then proceed accordingly as explained above.

In step 260, the present system may determine whether the styles pallet 402 has been closed. If so, the styles pallet 402 may be closed and the viewing of styles functionality may end. If the styles pallet is not closed in step 260, the present system may return to step 226 to check for further actions associated with styles functionality.

The visual and numeric aids described above may be displayed for any portion of text shown on GUI 400, including headers and footers. In the embodiments described above, both the visual and numeric indicators are displayed along side the styles in styles pallet 402 and along side the associated text. However, it is understood in further embodiments that the styles pallet 402 and/or the associated text may include only a visual indicator, with the numeric indicator being omitted. Similarly, in further embodiments, each of the styles in styles pallet 402 and/or the text may include only a numeric indicator, with the visual indicator being omitted.

For languages that are written horizontally, either left to right or right to left across a page, the visual and numeric aids may be displayed on GUI 400 as described above. However, for languages which are written vertically, such as, for example, certain Far East languages, the visual and numeric indicators may be rotated 90° so as to appear horizontally above or below vertically written text to give a clear indication of the styles applied to that text.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a computer system having a display and a user interface selection device, a method of providing a graphical user interface on the display, comprising the steps of:

(a) displaying a formatting style name on the graphic user interface;
(b) displaying text on the graphical user interface, the text formatted in the named style displayed in said step (a); and
(c) displaying at least one visual aid on the display indicating a relationship between the style name displayed in said step (a) and the text displayed in said step (b), said step (c) comprising the steps of:
  (c1) generating a color adjacent to the formatting style name displayed in said step (a), and
  (c2) automatically assigning the same color for display adjacent the text displayed in said step (b).

2. A method as recited in claim 1, wherein said step (c2) of automatically assigning the same color for display adjacent the text further comprises the step of displaying the text with color as a background for the text.

3. A method as recited in claim 1, wherein said step (c2) of automatically assigning the same color for display adjacent the text further comprises the step of displaying a box in a margin along side the text.

4. A method as recited in claim 2, wherein the text comprises a first text block, the formatting style name comprising a first formatting style name, and the visual aid comprises a first visual aid and the method further comprising the steps of:
  displaying a second text block, different than the first text block, formatted in a second style different than the first style; and
  displaying a second visual aid on the display indicating a relationship between the second style and the second text block, the second visual aid being different than the first visual aid.

5. A method as recited in claim 1, wherein said step (c) of displaying at least one visual aid on the display indicating a relationship between the style name and the text comprising the step of displaying a numeric indicator associated with both the style name and the text.

6. A method as recited in claim 5, wherein said step (c) of displaying a numeric indicator associated with both the style name and the text comprises the step of displaying one of a number, character or symbol associating the style name with the text.

7. A method as recited in claim 5, wherein said step (c) of displaying a numeric indicator associated with both the style name and the text comprises the step of displaying the numeric indicator adjacent the style name and displaying the numeric indicator adjacent the text.

8. A method as recited in claim 1, further comprising the step of highlighting text that is formatted by direct formatting.

9. A computer-readable storage medium having computer-executable instructions for programming a processor to perform a method of providing a graphical user interface on a display, the method comprising the steps of:
  (a) displaying a formatting style name on the graphic user interface;
  (b) displaying text on the graphical user interface, the text formatted in the named style displayed in said step (a); and
  (c) displaying at least one visual aid on the display indicating a relationship between the style name displayed in said step (a) and the text displayed in said step (b), said step (c) comprising the steps of:
    (c1) generating a number adjacent to the formatting style name displayed in said step (a), and
    (c2) automatically displaying that same number associated with the text displayed in said step (b).

10. A computer-readable storage medium as recited in claim 9, wherein said step (c) of displaying at least one visual aid on the display indicating a relationship between the style name and the text comprising the step of displaying a visual indicator associated with both the style name and the text.

11. A computer-readable storage medium as recited in claim 9, wherein said step (c) of displaying at least one visual aid on the display indicating a relationship between the style name and the text comprising the step of displaying the visual aid adjacent the style name and displaying the visual aid along side the text having the named style.

12. A computer-readable storage medium as recited in claim 10, wherein said step of displaying a visual indicator associated with both the style name and the text comprises the step of displaying a color associated with the style name, and displaying that same color associated with the text.

13. A computer-readable storage medium as recited in claim 9, wherein said step (c) of displaying at least one visual aid on the display indicating a relationship between the style name and the text comprises the step of displaying a numeric indicator associated with both the style name and the text.

14. A computer-readable storage medium as recited in claim 13, wherein said step (c) of displaying a numeric indicator associated with both the style name and the text comprises the step of displaying one of a number, character or symbol associating the named style with the text.

15. In a computer system having a display and a user interface selection device, a method of providing a graphical user interface on the display, comprising the steps of:
  (a) displaying a graphical object on the graphic user interface, the graphical object including at least one formatting style name;
  (b) providing an option on the graphical user interface for a user to display at least one visual aid on the display, the visual aid capable of indicating a relationship between the named style displayed in said step (a) and text displayed on the graphical user interface in the named style; and
  (c) displaying a text block on the graphical user interface formatted with the named style displayed in the graphical object of said step (a), the visual aid comprising displaying a color and a number adjacent the style name in the graphical object, and displaying the same color and number along the side of the text block.

16. The method recited in claim 15, said step (b) of providing an option on the graphical user interface for a user to display at least one visual aid on the display comprising the step of providing an option which may be selected and deselected with a single mouse click or a single key stroke.

17. The method recited in claim 15, further comprising the step of highlighting text in the text block that is formatted using direct formatting.

* * * * *